(12) United States Patent
Gallo et al.

(10) Patent No.: US 9,092,608 B2
(45) Date of Patent: Jul. 28, 2015

(54) RANDOM-ID FUNCTION FOR SMARTCARDS

(75) Inventors: Francesco Gallo, Graz (AT); Hauke Meyn, Krempermoor (DE); Wolfgang Buhr, Hamburg (DE)

(73) Assignee: NXP B.V., Eindhoven (NL)

( * ) Notice: Subject to any disclaimer, the term of this patent is extended or adjusted under 35 U.S.C. 154(b) by 229 days.

(21) Appl. No.: 13/309,419

(22) Filed: Dec. 1, 2011

(65) Prior Publication Data

US 2012/0146773 A1 Jun. 14, 2012

Related U.S. Application Data

(63) Continuation-in-part of application No. 12/967,059, filed on Dec. 14, 2010.

(51) Int. Cl.
| | |
|---|---|
| *G06F 21/00* | (2013.01) |
| *G06F 21/34* | (2013.01) |
| *H04L 9/08* | (2006.01) |
| *G06F 21/73* | (2013.01) |
| *G06F 21/74* | (2013.01) |
| *G06F 21/77* | (2013.01) |
| *G06F 21/81* | (2013.01) |
| *G06F 21/85* | (2013.01) |

(52) U.S. Cl.
CPC ............... *G06F 21/34* (2013.01); *G06F 21/73* (2013.01); *G06F 21/74* (2013.01); *G06F 21/77* (2013.01); *G06F 21/81* (2013.01); *G06F 21/85* (2013.01); *H04L 9/0877* (2013.01); *G06F 2221/2153* (2013.01)

(58) Field of Classification Search
CPC .............................. G06F 21/34; H04L 9/0877
USPC ............................................................ 380/46
See application file for complete search history.

(56) References Cited

U.S. PATENT DOCUMENTS

| | | | |
|---|---|---|---|
| 5,379,344 A * | 1/1995 | Larsson et al. ................ 380/251 |
| 5,721,777 A | 2/1998 | Blaze |
| 6,490,637 B1 | 12/2002 | Shih |
| 6,647,402 B1 | 11/2003 | Chiu |
| 6,804,763 B1 | 10/2004 | Stockdale et al. |
| 6,962,530 B2 | 11/2005 | Jackson |
| 7,148,803 B2 | 12/2006 | Bandy et al. |
| 7,809,959 B2 | 10/2010 | Dabbous et al. |
| 2002/0186838 A1* | 12/2002 | Brandys .......................... 380/30 |
| 2003/0188185 A1 | 10/2003 | Banerjee et al. |
| 2004/0060979 A1 | 4/2004 | Sukeda et al. |

(Continued)

FOREIGN PATENT DOCUMENTS

| | | |
|---|---|---|
| CN | 101252435 A | 8/2008 |
| EP | 1 669 877 A1 | 6/2006 |

(Continued)

OTHER PUBLICATIONS

Floerkemeier et al., "Scanning with a Purpose—Supporting the Fair Information Principles in RFID Protocols", 2005, pp. 214-231.*

(Continued)

*Primary Examiner* — Mohammad L Rahman
*Assistant Examiner* — Thaddeus Plecha

(57) ABSTRACT

A method for low-level security based on the UID. In particular it enhances an RFID system by adding the ability to dynamically modify the UID of the smartcard or to randomly generate a new UID for the smartcard.

10 Claims, 6 Drawing Sheets

(56) References Cited

U.S. PATENT DOCUMENTS

| | | |
|---|---|---|
| 2005/0183047 A1 | 8/2005 | Sapiro |
| 2006/0031676 A1 | 2/2006 | Vantalon et al. |
| 2007/0051816 A1* | 3/2007 | Chu .............................. 235/492 |
| 2007/0169174 A1 | 7/2007 | Critten et al. |
| 2008/0074269 A1* | 3/2008 | Torchalski et al. ........ 340/572.4 |
| 2008/0084311 A1* | 4/2008 | Salzman .................... 340/572.8 |
| 2008/0230612 A1* | 9/2008 | Nakabe et al. ................ 235/492 |
| 2009/0086978 A1 | 4/2009 | McAvoy et al. |
| 2010/0262841 A1 | 10/2010 | Ekberg et al. |
| 2011/0057779 A1* | 3/2011 | Canard et al. .............. 340/10.42 |
| 2011/0283002 A1* | 11/2011 | King ............................. 709/227 |

FOREIGN PATENT DOCUMENTS

| | | |
|---|---|---|
| EP | 1 965 332 A1 | 9/2008 |
| WO | 2009/013702 A2 | 1/2009 |
| WO | 2009/016540 A2 | 2/2009 |

OTHER PUBLICATIONS

Extended European Search Report for Patent Appln. No. 11193351.1 (May 6, 2013).

* cited by examiner

RANDOM-ID FUNCTION FOR SMARTCARDS

The present application is a continuation-in-part of pending U.S. patent application Ser. No. 12/967,059 filed on Dec. 14, 2010, the entire disclosure of which is incorporated herein by reference.

BACKGROUND

Smartcard, chip card or integrated circuit card is typically any pocket-sized card with embedded integrated circuits. Contactless smartcards typically are RFID (Radio Frequency Identification) type cards which suffer from collision problems. Collisions can occur when more than one smartcard is in the vicinity of the reader device. To help address the collision problem, smartcards typically support card ID (Identification) codes.

Two types of ID codes are the fixed Unique ID (UID) and the Random ID. A fixed UID code typically serves two functions. The UID is used in the anti-collision process to distinguish between multiple cards presented in parallel in the vicinity of the reader device and address the cards individually. A UID is also used by the reader device to ascertain the identity of a hardcoded or virtual card device to determine which keys to use when addressing the device. The Random-ID code is typically newly generated at each Power-UP of the card and is stored in RAM. Hence, when a Random-ID code scheme is used by the card, the reader device typically receives a new Random-ID from the card each time the card is brought into the RF-field of the reader device.

Some applications that use fixed UIDs, typically in the customer card area, have been rejected by users or card issuers because a large number of users objected to the full trackability of the smartcards having UIDs from location to location. Particularly for smartcards with RFID or other contactless interfaces, protection against unwanted tracking of interactions with reader devices or tracking of location changes is typically desirable from a user point of view. The use of Random-IDs is recommended from both a security and privacy point of view for secure cards to prevent individual cards from being tracked from location to location where the Random-ID code is exposed during the anti-collision process.

DETAILED DESCRIPTION

In accordance with the invention, a smartcard is implemented that combines the capabilities of a fixed UID code with that of a changing Random-ID code by changing the Random-ID code only at specific times under the control of the card user. In some embodiments in accordance with the invention, for arbitrary time periods the smartcard can be used like a smartcard having a fixed UID code, allowing tracking from card reader location to card reader location and allowing collection of the history information about all interactions of the smartcard in the time between two Random-ID code generations. In accordance with the invention, smartcards requiring only low-security based on UID codes, the UID code may be changed dynamically based on a UID sent from the reader device to the RFID smartcard or the UID is changed dynamically based on a random number generator in the RFID smartcard where the smartcard sends the newly generated UID to the card reader.

Embodiments in accordance with the invention provide an integrated circuit card capable of generating Random-ID codes in response to requests by the card user via an external interface or allow dynamic changes of the UID code.

In an embodiment in accordance with the invention, the most recently generated Random-ID code is typically stored in an on-chip non-volatile non-secure memory so that it may be used as a quasi-static ID code or "PseudofixedRandomUID" until the next Random-ID code generation is triggered by the card user. Until a new Random-ID code is generated, the stored Random-ID is used during the anti-collision process each time the card is activated by a reader device, even if the card has experienced a reset event such as a Power-Down or reader RF-field off event. Therefore, until a new Random-ID is generated in response to a user request, the card operates as a card configured to use a fixed UID.

Figure 1:
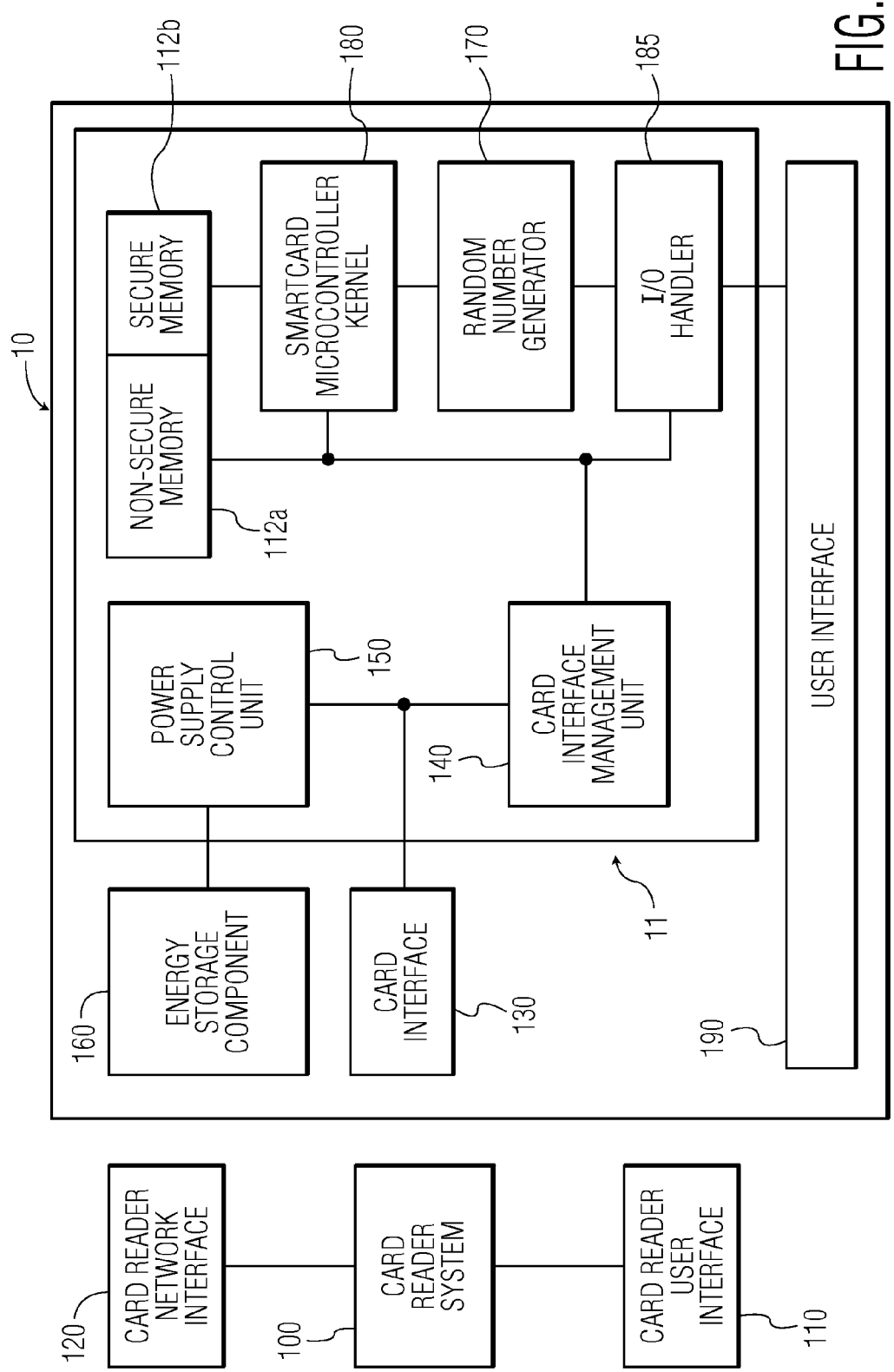
FIG. 1 shows an embodiment in accordance with the invention.

FIG. 1 shows an embodiment in accordance with the invention. Smartcard 10 incorporates user-controlled Random-ID code generation. Smartcard 10 has user interface 190 which allows the card user to generate and store a new Random-ID code, "PseudoFixedRandomUID" in nonvolatile non-secure memory 112a. User interface 190 may be implemented as, for example, a push button or other suitable device electrically coupled to I/O handler 185. Each time the card user pushes the button of user interface 190, smartcard 10 will internally generate a new Random-ID code using random number generator 170 which is electrically coupled to smartcard microcontroller kernel 180. Smartcard microcontroller kernel 180 is electrically coupled to both nonvolatile secure memory 112b and nonvolatile non-secure memory 112a. Secure memory 112b is characterized by having restricted access rights that limit the operation modes during which it may be read or written to by microcontroller kernel 180 (more generally the CPU) and cannot be freely accessed by peripheral blocks such as, for example, a universal asynchronous receiver/transmitter, a direct memory interface or an I/O port. Hence, kernel 180 is able to access both nonvolatile secure memory 112b and nonvolatile non-secure memory 112a separately in operation modes with different security levels. For certain secure operation modes, such as the boot-phase or the smartcard authentication procedure, kernel 180 has access to portions of non-volatile secure memory 112b that are not accessible in other operation modes. This hardware-implemented security feature prevents application software running on kernel 180 from accessing keycodes, error flags and security related data needed in the secure operation mode. Smartcard 10 interacts with card reader system 100 which is electrically coupled to card reader user interface 110 and card reader network interface 120.

User interface 190 may be implemented in an embodiment in accordance with the invention as a dedicated firmware function that can be called and executed by a user software package installed on smartcard 10. This embodiment is typically suitable when smartcard 10 is embedded in a larger communication or identification environment such as, for example, a mobile phone, a portable computer or a tablet computer, and allows the generation and storage of a new Random-ID code to be initiated by a special menu option in the User Menu of the device.

In an embodiment in accordance with the invention, power to smartcard 10 may be buffered by energy storage component 160 which is electrically coupled to power supply control unit 150 that is either integrated into smartcard 10 as shown in FIG. 1 or is part of the environment, for example, a mobile phone or other suitable portable electronic device, in which smartcard 10 is operated. Energy storage component 160 insures that sufficient power is available to initiate and execute the generation of a new Random-ID code for smartcard 10. When the user initiates the generation of a new Random-ID code, energy storage component 160 supplies power to smartcard microcontroller kernel 180 and non-volatile non-secure memory 112a which stores the Random-ID code, "PseudoFixedRandomUID" and application related public data such as, for example, address lists and Internet links, and non-volatile secure memory 112b which stores encryption key data, status flags and error counters. Note that the typical prior-art Random-ID code is a session related ID for smartcard 10 which is regenerated anytime that smartcard 10 is newly introduced to card reader system 100 and deleted at the end of the interaction with card reader system 100. Therefore, the typical prior-art Random-ID code is typically stored in RAM (volatile memory). However, in accordance with the invention, the Random-ID code, "PseudoFixedRandomUID", is fixed over multiple communication sessions with different card reader systems 100 (e.g. at different locations) until the user initiates the generation of a new Random-ID code, "PseudoFixedRandomUID". Because the Random-ID code in accordance with the invention is used like a fixed UID code for user determined periods of time and is transmitted openly by smartcard 10 to card reader system 100 at the start of each communication session, the Random-ID code is stored in nonvolatile non-secure memory 112a.

Nonvolatile secure memory 112b stores session-keys or login codes that are received by smartcard 10 from the Application Environment when smartcard 10 is newly introduced to card reader system 100. Typically the Application Environment includes a SmartCard Reader Terminal which is part of a server-network that centrally controls all transactions of SmartCards using the particular application. Non-volatile secure memory 112b also stores private data generated within the Application Environment. This private data typically comprises articles selected for purchase within a supermarket type of environment, services or pages used with an Internet application and points of sale that have been visited by the user in a shopping mall type environment. In accordance with the invention, such private data should only be accessible by the Application Environment that generated the data and only accessible while the "PseudoFixedRandomUID" under which the private data was created is still valid. The private data is encrypted in a two step approach based on an encryption key stored in nonvolatile secure memory 112b that is diversified using the current "PseudoFixedRandomUID" stored in nonvolatile non-secure memory 112a so that the generation of a new "PseudoFixedRandomUID" by the user invalidates the data stored in non-volatile secure memory 112b.

Energy storage component 160 may include capacitive energy storage that is charged via the RF-field of card reader system 100 or via electrical contact of smartcard 10 with card reader system 100. Capacitive energy storage allows a limited number of user actions before power is exhausted. Capacitive energy storage component 160 needs to provide at least enough energy storage to allow the proper completion or proper termination of an executing Random-ID code generation process in the event card smartcard 10 is abruptly removed out of the RF-field of card reader system 100 or out of electrical contact with card reader system 100.

Typically, the power supply for operating smartcard 10 is obtained via the RF-field from card reader system 100 interacting with card interface 130 or from electrical contact by card reader system 100 with card interface 130. Card interface 130 may include an RF receiver antenna and electrical contact pads for electrically coupling to card reader system 100 in an embodiment in accordance with the invention. Card interface management unit 140 is electrically coupled to card interface 130 and to power supply control unit 150, I/O handler 185, random number generator 170, smartcard microcontroller kernel 180, and memory 112a and 112b.

In an embodiment in accordance with the invention, a back-up battery may be integrated into smartcard 10 which is only used by smartcard core 11 when no external power is available, for example, from card reader system 100. If smartcard 10 is embedded in a larger communication or identification environment, a back-up battery function may be integrated into the communication or identification environment to supply the back-up power. The availability of additional power allows the use of buffered RAM memory in place of non-volatile EEPROM or flash memory for memory 112a and 112b.

In an embodiment in accordance with the invention, smartcard 10 includes an embedded multi-character display as part of user interface 190. The multi-character display can function to provide information relating to the operation of smartcard 10 such as the time of the latest Random-ID code update, the charge status, error codes, or a status/data display for applications currently being executed on smartcard 10.

In an embodiment in accordance with the invention, smartcard 10 includes an encryption capability for secure memory 112b that encrypts or decrypts the contents of that portion of memory 112b that contain the card status information and the UID-related card. The encryption of the UID-related card data typically depends on the current Random-ID code, "PseudoFixedRandomUID", stored in non-volatile non-secure memory 112a. This provides a key diversification for the secured data. Hence, for each new Random-ID code that is generated by the user, the existing contents of the UID related part of secured memory 112b would be invalidated because of the change in the key used for memory access. Therefore, each new Random-ID code generation by the user represents a memory clear of the UID-related portion of nonvolatile secure memory 112b.

In accordance with the invention, the typical smartcard standards need to be modified to accommodate reserved code space for "pseudo UIDs". Typical smartcard standards have reserved code spaces for genuine UIDs and prior-art Random-IDs. In an embodiment in accordance with the invention, the code space (existing smartcard standards define certain coding spaces for different kinds of IDs) for the targeted "pseudo UIDs" is typically defined as separate from the code spaces reserved for genuine UIDs. Genuine UIDs are the unique ID codes for smartcards 10 that are created by the card manufacturer at the time of smartcard manufacture and the Random-ID codes stored in RAM and re-generated at each smartcard reset when smartcard 10 is newly introduced into the proximity of card reader system 100. The "PseudoFixedRandomUID" codes in accordance with the invention are stored in non-volatile non-secure memory 112a and regenerated only at the discretion of the user. This allows implementations of card reader system 100 that when receiving the UID-code from smartcard 10 can distinguish these types of ID codes and adapt their ID handling processes accordingly. The system within which smartcard 10 is used separates the full coding space for a given ID width into separate value spaces where each space is reserved for a specific ID type (Random-ID, UID, pseudo ID). This means that certain bits in the ID code of smartcard 10 indicate which type of ID-code it is.

Figure 2:
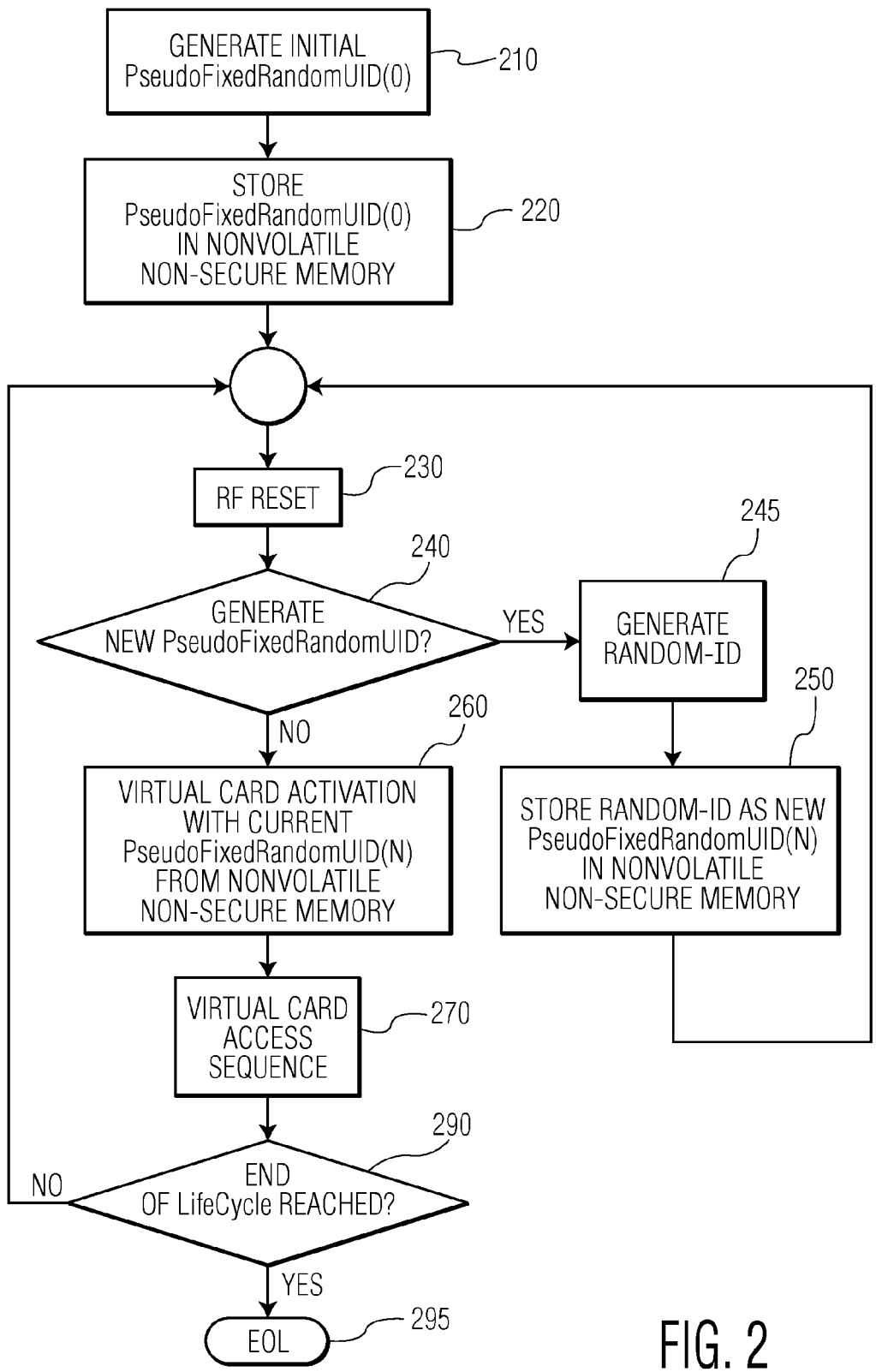
FIG. 2 shows an embodiment in accordance with the invention.

FIG. 2 shows the relevant life cycle of an embodiment in accordance with the invention. In step 210 of the lifecycle, an initial Random-ID code, "PseudoFixedRandomUID(0)" is generated during production or testing of smartcard 10. In step 220, also during production or testing of smartcard 10, "PseudoFixedRandomUID(0)" is stored in nonvolatile non-secure memory 112a. Steps following step 220 are performed once smartcard 10 is in possession of the card user. In step 230, an RF reset is performed. RF reset means that when smartcard 10 enters the RF-field of card reader system 100 or is electrically connected to card reader system 100, a card reset procedure is initiated by smartcard microcontroller kernel 180. In step 240 the card user is given the opportunity to generate and store a new Random-ID code, "PseudoFixedRandomUID". Based on user input through user interface 190, either a Random-ID code is generated in step 245 using random number generator 170 or virtual card activation of smartcard 10 occurs in step 270 with the current "PseudoFixedRandomUID(N)" stored in nonvolatile non-secure memory 112a. Virtual activation occurs when smartcard 10 is selected and activated by card reader system 100 which receives the current "PseudoFixedRandomUID(N)" as the fixed card UID. After the step 270, a check is performed in step 290 to determine if smartcard 10 has reached the end of its lifecycle. If the end of the lifecycle (EOL) has been reached for smartcard 10, smartcard 10 is inactivated and becomes inoperable in step 295. If the end of the lifecycle of smartcard 10 has not been reached, an RF reset is performed in step 230 and smartcard 10 awaits user input via user interface 190 regarding generation of a new Random-ID code in step 240.

If the user has generated a new Random-ID code, the new Random-ID code is stored in nonvolatile non-secure memory 112a as "PseudoFixedRandomUID(N)" in step 250. Subsequent to step 250, an RF reset is performed in step 230 and smartcard 10 awaits user input via user interface 190 regarding generation of a new Random-ID code in step 240.

Figure 3A:
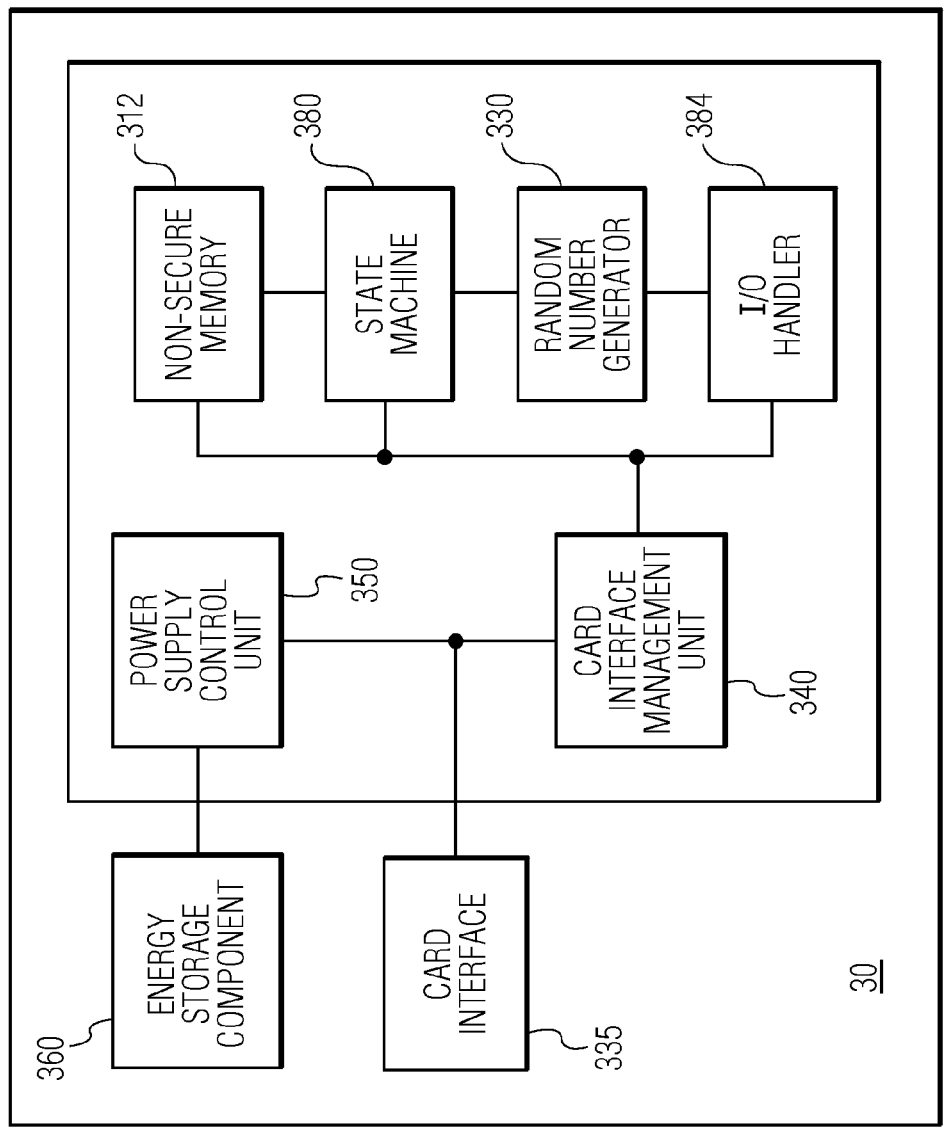
FIG. 3a shows an embodiment in accordance with the invention.
Figure 3A:
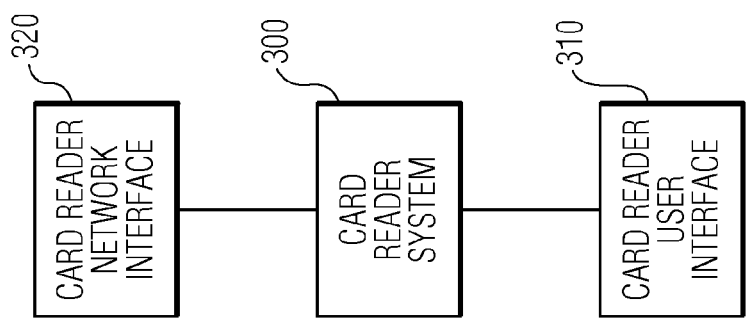

FIG. 3a shows an embodiment in accordance with the invention. Low cost smartcard 30 may incorporate random number generator 330 to generate a new Random-ID code referred to as the "PseudoRandomUID" each time smartcard 30 interacts with card reader system 300 to enhance security and avoid tracking. Card reader system 300 is electrically coupled to card reader user interface 310 and to card reader network interface 320. Each interaction by smartcard 30 with card reader system 300 results in a new "PseudoRandomUID" being created for smartcard 30. Random number generator 330 is electrically coupled to smartcard state machine 380 which is electrically coupled to non-secure memory 312. State machine 380 functions to both store "PseudoRandomUID" in non-secure memory 312 and retrieve "PseudoRandomUID" from non-secure memory 312 as needed to interact with card reader system 300.

In an embodiment in accordance with the invention, power to smartcard 30 may be buffered by energy storage component 360 which is electrically coupled to power supply control unit 350 which is part of smartcard 30. Energy storage component 360 insures there is sufficient power available for generation of a new Random-ID code for smartcard 30. Energy storage component 360 may include capacitive energy storage that is charged via the RF-field of card reader system 300. The capacitive energy storage component 360 needs to be sufficient to provide at least enough energy to allow the proper completion of an executing Random-ID code generation process in the event that smartcard 30 is abruptly removed out of the RF-field of card reader system 300.

Typically, the power supply for operating smartcard 30 is obtained via the RF-field from card reader system 300 interacting with card interface 335. Card interface 335 may include an RF receiver antenna for electromagnetically coupling to card reader system 300. Card interface management unit 340 is electrically coupled to card interface 335 and to power supply control unit 350, I/O handler 384, random number generator 330, state machine 380 and non-secure memory 312.

Each time smartcard 30 interacts with card reader system 300 via card reader user interface 310, energy storage component 360 supplies power to random number generator 330, state machine 380 and non-secure memory 312 which stores the newly generated Random-ID code, "PseudoRandomUID" for the next interaction with card reader system 300 by smartcard 30.

Figure 3B:
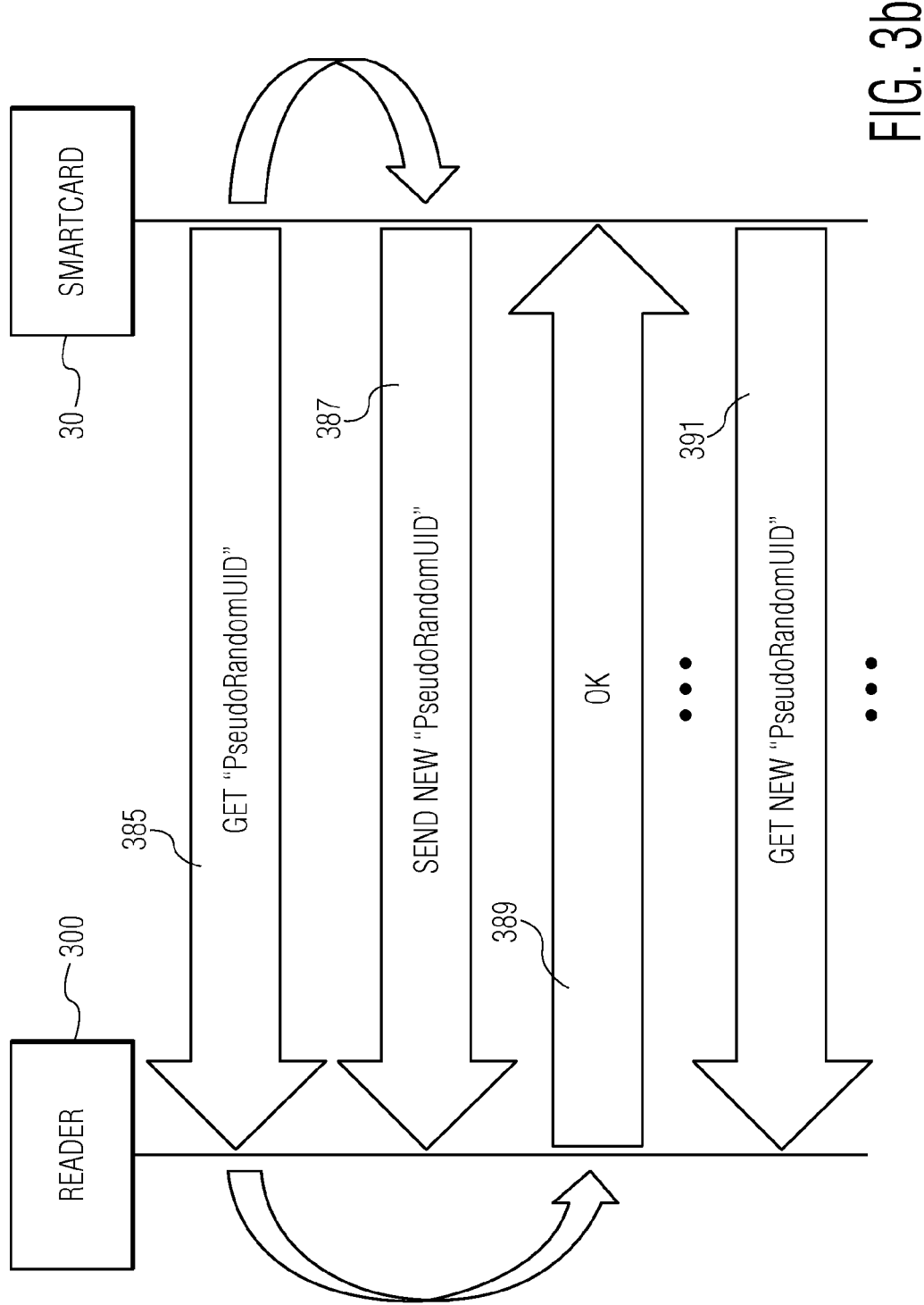
FIG. 3b shows an embodiment in accordance with the invention.

FIG. 3b shows an embodiment in accordance with the invention. Card reader system 300 interacts with smartcard 30 in step 385 where smartcard 30 provides the current "PseudoRandomUID" which is the Random-ID currently associated with smartcard 30 to card reader system 300. The current "PseudoRandomUID" is also stored locally in card reader system 300 or remotely in a network database accessible to card reader system 300 via card reader network interface 320. The new "PseudoRandomUID" is generated by random number generator 330 and provided to card reader system 300 in step 387. Once card reader system 300 verifies that the current "PseudoRandomUID" is valid, card reader system 300 stores the new "PseudoRandomUID" either locally or remotely in the network database and provides a positive response in step 389 which results in smartcard 30 storing the new "PseudoRandomUID" in non-secure memory 312 (see FIG. 3a) for the next interaction with card reader system 300. Note that the subsequent interaction shown in step 391 may be with a physically different card reader system 300 or the same physical card reader system 300 in accordance with the invention. A benefit of having smartcard 30 generate a new "PseudoRandomUID" with every interaction is that security is enhanced as the "PseudoRandomUID" is used only for a single interaction and it is typically difficult to eavesdrop on the communication from smartcard 30 to card reader system 300 for contactless systems based on inductive fields.

Figure 4A:
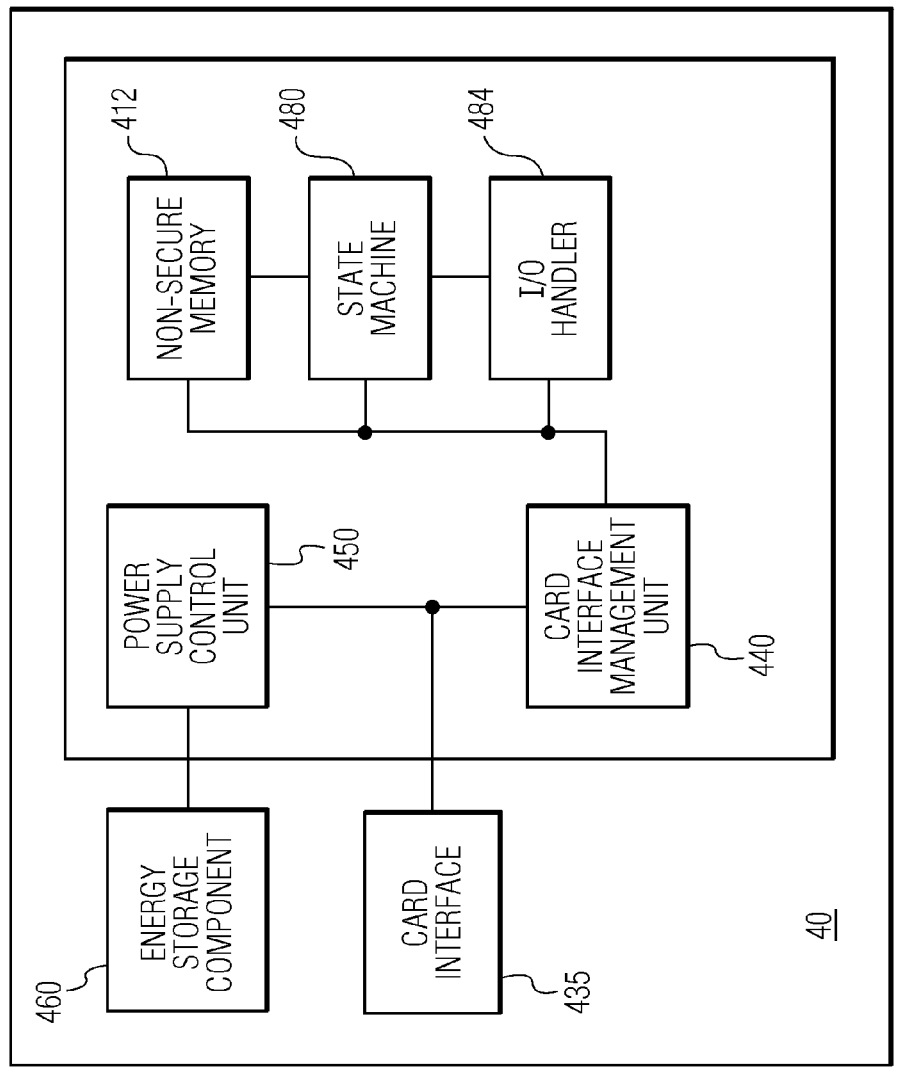
FIG. 4a shows an embodiment in accordance with the invention.
Figure 4A:
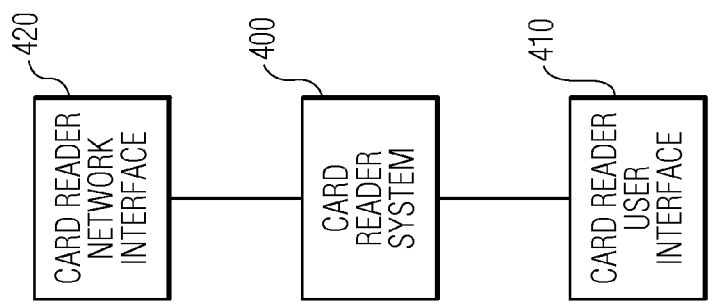

FIG. 4a shows an embodiment in accordance with the invention. Low cost smartcard 40 does not incorporate a random number generator to generate a new Random-ID code referred to as the "PseudoRandomUID" each time smartcard 40 interacts with card reader system 400 which provides a cost savings for smartcard 40 compared to smartcard 30. Card reader system 400 is electrically coupled to card reader user interface 410 and to card reader network interface 420. Each interaction by smartcard 40 with card reader system 400 results in a new "PseudoRandomUID" being provided to smartcard 40 by card reader system 400 to provide security and prevent tracking Smartcard state machine 480 is electrically coupled to non-secure memory 412. State machine 480 functions to both store "PseudoRandomUID" in non-secure memory 412 and retrieve "PseudoRandomUID" from non-secure memory 412 as needed to interact with card reader system 400.

In an embodiment in accordance with the invention, power to smartcard 40 may be buffered by energy storage component 460 which is electrically coupled to power supply control unit 450 which is part of smartcard 40. Energy storage component 460 may include capacitive energy storage that is charged via the RF-field of card reader system 400. The capacitive energy storage component 460 needs to be sufficient to provide at least enough energy to allow the proper completion of executing the Random-ID code transmission process.

Typically, the power supply for operating smartcard 40 is obtained via the RF-field from card reader system 400 interacting with card interface 435. Card interface 435 may include an RF receiver antenna for electromagnetically coupling to card reader system 400. Card interface management unit 440 is electrically coupled to card interface 435 and to power supply control unit 450, I/O handler 484, random number generator 430, state machine 480 and non-secure memory 412.

Each time smartcard 40 interacts with card reader system 400 via card reader user interface 410, energy storage component 460 supplies power to state machine 480 and non-secure memory 412 which stores the newly provided Random-ID code, "PseudoRandomUID" for the next interaction with card reader system 400 by smartcard 40.

Figure 4B:
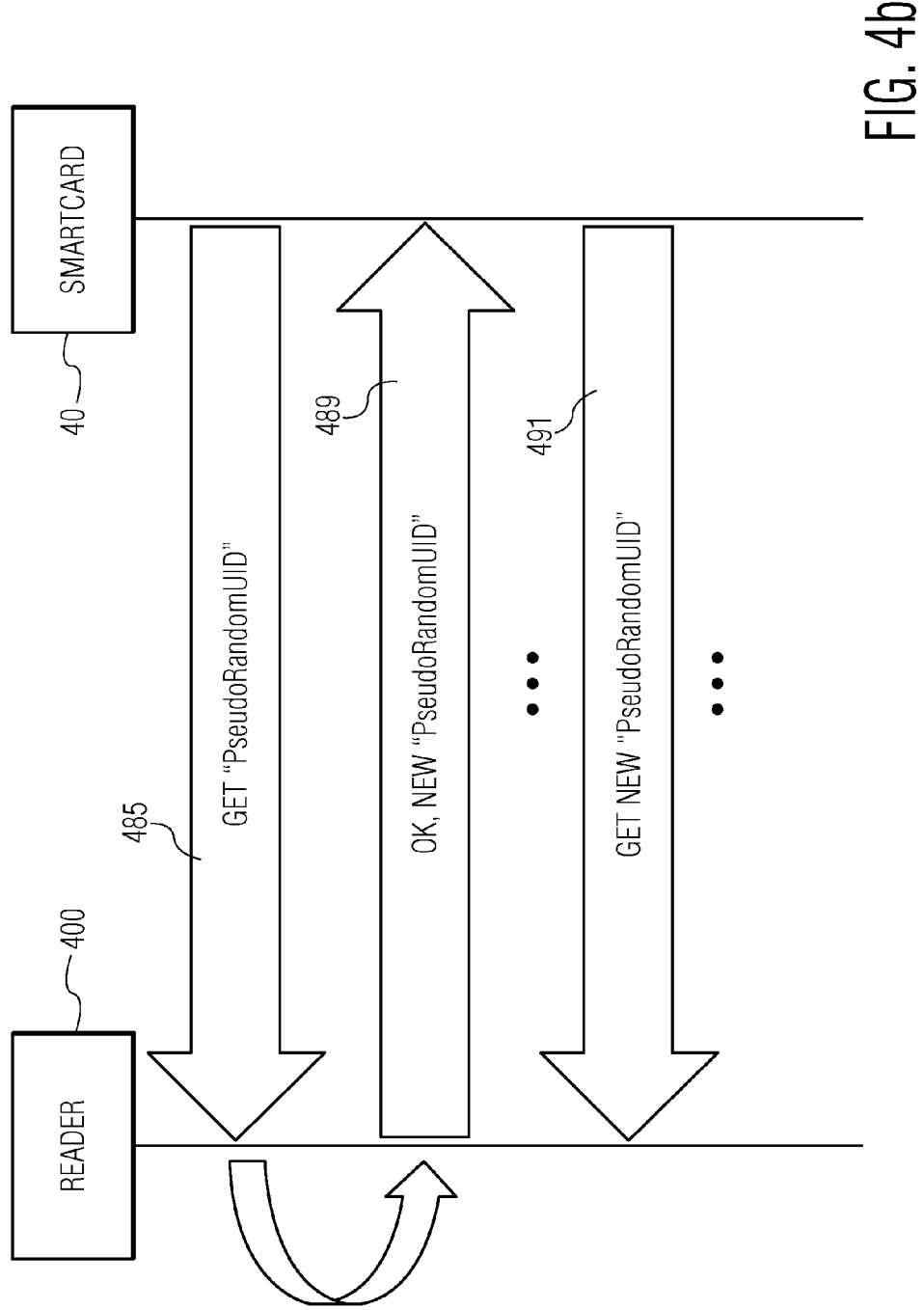
FIG. 4b shows an embodiment in accordance with the invention.

FIG. 4b shows an embodiment in accordance with the invention. Card reader system 400 interacts with smartcard 40 in step 485 where smartcard 40 provides the current "PseudoRandomUID" which is the Random-ID currently associated with smartcard 40 and stored in non-secure memory 412 to card reader system 400. The current "PseudoRandomUID" associated with smartcard 40 is also stored locally in card reader system 400 or remotely in a network database accessible to card reader system 400 via card reader network interface 420. A new "PseudoRandomUID" is provided by card reader system 400 in step 489 to smartcard 40 once card reader system 400 verifies that the current "PseudoRandomUID" is valid. This results in smartcard 40 storing the new "PseudoRandomUID" in non-secure memory 412 (see FIG. 4a) for the next interaction with card reader system 400. Note that the subsequent interaction shown in step 491 where card reader system 400 gets the new "PseudoRandomUID" from smartcard 40 may be with a physically different card reader system 400 or the same physical card reader system 400 in accordance with the invention. Note that this embodiment is typically less secure than the embodiment shown in FIGS. 3a-b because it is typically much easier to eavesdrop on communications using inductive fields that proceed from card reader system 400 to smartcard 40. However, this embodiment is a lower cost solution because it avoids the need for random number generator 330 in smartcard 40.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for dynamically changing a random card identification code associated with a smartcard in a system having a card reader system interacting with the smartcard comprising:
    providing a current random card identification code associated with the smartcard from the smartcard to the card reader system at the beginning of an interaction between the smartcard and the card reader system;
    verifying whether the current random card identification code is valid in the card reader system; and
    providing a new random card identification code from the card reader system to the smartcard if the current random card identification code is valid;
    wherein the smartcard comprises a state machine that operates to replace the current random card identification code with the new random card identification code in a non-secure memory of the smartcard when the new random card identification code is provided to the smartcard;
    wherein the current random card identification code and the new random card identification code are card identification codes that are used in an anti-collision process to distinguish between multiple smartcards and the current and new random card identification codes are used to encrypt contents of a secure memory of the smartcard.

2. The method of claim 1 wherein the current random card identification code associated with smartcard is stored remotely in a network database accessible to the card reader system.

3. The method of claim 1 wherein the new random card identification code is stored locally in the card reader system.

4. The method of claim 1 wherein the smartcard comprises an energy storage component.

5. A method for dynamically changing a random card identification code associated with a smartcard in a system having a card reader system interacting with the smartcard comprising:
    providing a current random card identification code associated with the smartcard from a non-secure memory of the smartcard to the card reader system at the beginning of an interaction between the smartcard and the card reader system;
    generating a new random card identification code using a random number generator in the smartcard;
    providing the new random card identification code to the card reader system;
    verifying whether the current random card identification code is valid in the card reader system; and
    replacing the current random card identification code with the new random card identification code in the non-secure memory of the smartcard if the current random card identification code is verified to be valid in the card reader system;
    wherein the current random card identification code and the new random card identification code are card identification codes that are used in an anti-collision process to distinguish between multiple smartcards and the current and new random card identification codes are used to encrypt contents of a secure memory of the smartcard.

6. The method of claim 5 wherein the current random card identification code associated with smartcard is stored remotely in a network database accessible to the card reader system.

7. The method of claim 5 wherein the new random card identification code is stored locally in the card reader system.

8. The method of claim 5 wherein the smartcard comprises a state machine to store and retrieve the random card identification code from the non-secure memory.

9. The method of claim 5 wherein the smartcard comprises an energy storage component.

10. The method of claim 9 wherein the energy storage component is a capacitor.

* * * * *